(12) United States Patent
Jakob et al.

(10) Patent No.: US 10,947,431 B2
(45) Date of Patent: Mar. 16, 2021

(54) CROSSLINKABLE SILICONE MIXTURES CONTAINING A GUANIDINE CATALYST AND AN ADHESION PROMOTER

(71) Applicant: SIKA TECHNOLOGY AG, Baar (CH)

(72) Inventors: Samuel Jakob, Dietikon (CH); Manuel Friedel, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 14 days.

(21) Appl. No.: 16/345,763

(22) PCT Filed: Nov. 9, 2017

(86) PCT No.: PCT/EP2017/078802
§ 371 (c)(1),
(2) Date: Apr. 29, 2019

(87) PCT Pub. No.: WO2018/087250
PCT Pub. Date: May 17, 2018

(65) Prior Publication Data
US 2019/0300768 A1    Oct. 3, 2019

(30) Foreign Application Priority Data

Nov. 11, 2016 (EP) ..................... 16198479

(51) Int. Cl.
| | | |
|---|---|---|
| *C09J 183/04* | (2006.01) | |
| *C08G 77/16* | (2006.01) | |
| *C08G 77/388* | (2006.01) | |
| *C09D 183/04* | (2006.01) | |

(52) U.S. Cl.
CPC ............ *C09J 183/04* (2013.01); *C08G 77/16* (2013.01); *C08G 77/388* (2013.01); *C09D 183/04* (2013.01)

(58) Field of Classification Search
None
See application file for complete search history.

(56) References Cited

U.S. PATENT DOCUMENTS

| | | | | |
|---|---|---|---|---|
| 3,837,876 A | * | 9/1974 | Mayuzumi | C08J 7/0427 106/287.11 |
| 4,248,993 A | * | 2/1981 | Takago | C07F 7/0892 528/38 |
| 4,378,250 A | * | 3/1983 | Treadway | C09D 183/06 106/287.11 |
| 4,412,035 A | * | 10/1983 | Kurita | C08G 77/06 524/796 |
| 4,483,973 A | * | 11/1984 | Lucas | C08L 83/16 528/21 |
| 4,562,237 A | * | 12/1985 | Okuno | C08G 18/10 524/775 |
| 4,602,078 A | * | 7/1986 | Joseph | C08K 5/54 528/18 |

(Continued)

FOREIGN PATENT DOCUMENTS

| | | |
|---|---|---|
| DE | 69207858 T2 | 7/1996 |
| EP | 0658588 A1 | 6/1995 |

(Continued)

OTHER PUBLICATIONS

Ewa D. Raczynska "Prediction of Tautomeric Equilibria for N,N',N'-Trisubstituted, N,N'-Disubstituted and N-Monosubstituted Guanidines" J. Chem. Soc. Perkin Trans II 1989, 1789-1793. (Year: 1989).*

(Continued)

*Primary Examiner* — Robert S Loewe
(74) *Attorney, Agent, or Firm* — Oliff PLC

(57) ABSTRACT

A crosslinkable silicone composition including: a. at least one condensation-crosslinkable polydiorganosiloxane P having silanol, alkoxysilyl, carboxysilyl, ketoximinosilyl, amidosilyl and/or aminosilyl end groups; b. at least one silane or siloxane crosslinker V for the condensation-crosslinkable polydiorganosiloxane; c. at least one crosslinking catalyst K1 of the general formula (I)

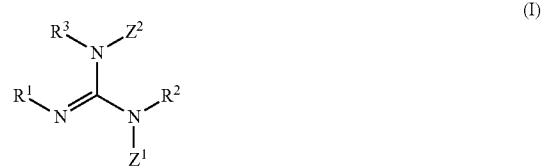

d. at least one adhesion promoter H of the general formula (IV).

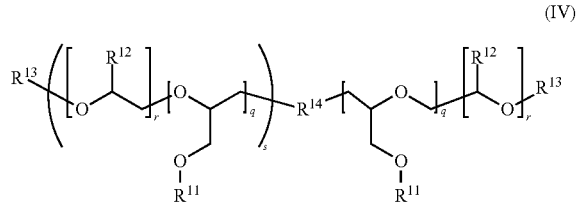

Compositions of this kind are especially suitable as adhesives, sealants, coatings or casting compounds and are notable for a low tendency to separate and very good adhesion under moist and warm conditions.

14 Claims, No Drawings

(56) References Cited

U.S. PATENT DOCUMENTS

| | | | | |
|---|---|---|---|---|
| 4,797,446 A | * | 1/1989 | Dietlein | C08L 83/04 427/387 |
| 4,978,704 A | * | 12/1990 | Perrin | C08K 5/544 524/127 |
| 4,996,112 A | * | 2/1991 | Perrin | C08K 5/5465 428/447 |
| 5,405,889 A | * | 4/1995 | Hatanaka | C08L 83/04 523/210 |
| 5,717,009 A | * | 2/1998 | Matsushita | C09J 183/04 523/212 |
| 6,107,435 A | * | 8/2000 | Palmer | C08K 3/36 524/847 |
| 6,166,121 A | * | 12/2000 | Nishiumi | C08K 9/04 524/270 |
| 6,534,581 B1 | * | 3/2003 | Kleyer | C08K 5/04 524/379 |
| 8,076,439 B2 | * | 12/2011 | Matsushita | C08G 65/336 156/60 |
| 2006/0199901 A1 | | 9/2006 | Sakamoto | |
| 2013/0096257 A1 | * | 4/2013 | Yamamoto | C09D 183/04 524/860 |
| 2016/0174385 A1 | * | 6/2016 | Okabe | H05K 3/1283 252/500 |
| 2016/0200875 A1 | * | 7/2016 | Patel | C08K 5/54 528/33 |

FOREIGN PATENT DOCUMENTS

| | | |
|---|---|---|
| EP | 2840087 A1 | 2/2015 |
| WO | 2015/026687 A1 | 2/2015 |

OTHER PUBLICATIONS

May 14, 2019 International Preliminary Report on Patentability issued in International Patent Application No. PCT/EP2017/078802.

Feb. 6, 2018 International Search Report issued in International Patent Application No. PCT/EP2017/078802.

* cited by examiner

CROSSLINKABLE SILICONE MIXTURES CONTAINING A GUANIDINE CATALYST AND AN ADHESION PROMOTER

TECHNICAL FIELD

The present invention relates to the field of two-component silicone compositions as used as sealants and adhesives in particular.

PRIOR ART

Condensation-crosslinking silicones have long been known. These may be formulated in one- or two-component form. While it is possible in the case of formulation of one-component silicones (RTV-1) to provide titanate-catalyzed systems, two-component systems (RTV-2) typically require tin catalysts to assure good through-curing. Organic tin compounds have a severe effect on man and the environment, and some species have even been shown to be mutagenic and reprotoxic. It would therefore be advantageous from an EHS point of view to be able to dispense with organotin compounds.

There has been no lack of attempts to use other complexes or compounds of other metals as catalysts. In addition, various organic bases have been used as catalysts. However, a common factor in many alternative catalysts is that they have zero or only poor miscibility in the polysiloxane matrix of the silicones and have a tendency to separate. This makes the catalysis inefficient, and the storage stability of resulting mixtures can be very limited. Moreover, many of the systems described are not commercially available and are synthesizable only with great complexity and hence costly.

Likewise known from the literature, for example EP2840087, are functionalized guanidines that have been compatibilized in a PDMS matrix by the application of oligosiloxane substituents to the guanidines and can be used as catalysts for curing of RTV silicones. However, disadvantages of these catalysts are incompatibilities with standard aminosilane-based adhesion promoters, which leads to loss of adhesion under environmental stresses.

SUMMARY OF THE INVENTION

It is therefore an object of the present invention to provide a tin-free two-component silicone composition that shows good adhesion even under difficult environmental conditions and does not show a tendency to separate or poor storage stability.

It has been found that, surprisingly, this object is achieved by silicone compositions as claimed in claim 1.

The use of a guanidine catalyst with siloxane functions in combination with a specific adhesion promoter makes it possible to formulate tin-free compositions that do not have a tendency to separate and do not lose adhesion even under moist and warm conditions.

Further aspects of the invention form the subject matter of further independent claims. Particularly preferred embodiments of the invention form the subject matter of the dependent claims.

WAYS OF EXECUTING THE INVENTION

The present invention relates to a crosslinkable silicone composition comprising
a. at least one condensation-crosslinkable polydiorganosiloxane P having silanol, alkoxysilyl, especially methoxysilyl and/or ethoxysilyl, carboxysilyl, especially acetoxysilyl, ketoximinosilyl, am idosilyl and/or am inosilyl end groups;
b. at least one silane or siloxane crosslinker V for the condensation-crosslinkable polydiorganosiloxane, preferably tri- or tetrafunctional silanes or hydrolyzates, partial hydrolyzates and/or condensates thereof;
c. at least one crosslinking catalyst K1 of the general formula (I)

where $Z^1$ and $Z^2$ independently represent H or linear or branched oligodiorganylsiloxanes of the general formulae (II) and (III)

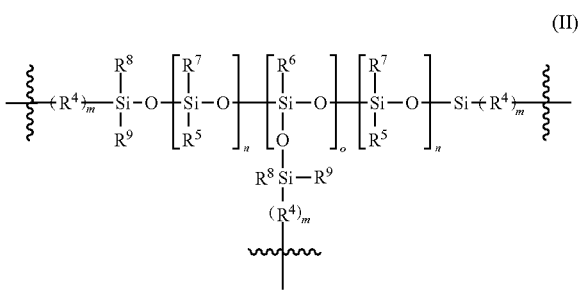

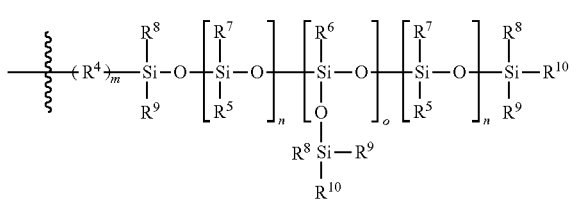

where index n represents an integer value from 1 to 400, preferably 2 to 100, especially 5 to 50; index m represents an integer value of 1, 2 or 3; index o represents an integer value from 0 to 10; and
the $R^5$ to $R^{10}$ radicals independently represent a monovalent aliphatic linear or branched C1 to C8 alkyl radical which optionally contains ring structures and/or heteroatoms selected from the group of halogens, N, O, P and S, especially a methyl, ethyl, propyl, phenyl or trifluoropropyl radical;
the $R^4$ radical independently represents a divalent aliphatic linear or branched C1 to C8 alkyl radical which optionally contains ring structures and/or heteroatoms selected from the group of halogens, N, O, P and S; and
the $R^1$ to $R^3$ radicals independently represent a hydrogen atom or an aliphatic linear or branched C1 to C8 alkyl radical which optionally contains ring structures and/or heteroatoms selected from the group of halogens, N, O, P and S, where the $R^1$ to $R^3$ radicals may be joined to form one or two aliphatic or aromatic rings and the guanidine of the formula (I) may optionally be in protonated form;

with the proviso that at least one $Z_1$ or $Z_2$ is a linear or branched oligodiorganylsiloxane of the formula (II) or formula (III);
d. at least one adhesion promoter H of the general formula (IV)

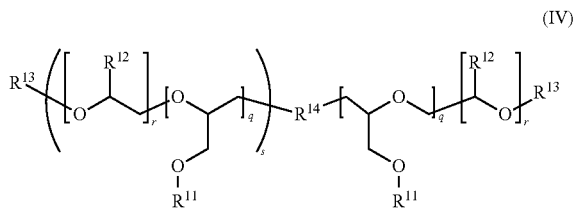

(IV)

where indices q, r and s independently represents an integer value from 0 to 10, preferably from 0 to 5, especially from 0 to 2, with the proviso that the sum total of $q+r \geq 1$;

the $R^{11}$ radicals are independently a monovalent linear or branched C1-C21 alkyl radical which may be substituted by one or more heteroatoms selected from the group of B, N, O, Si, S and P and/or may contain aliphatic or aromatic cycles and/or may contain double bonds;

the $R^{12}$ radicals are independently a monovalent linear or branched C3-C21 alkyl radical which may be substituted by one or more heteroatoms selected from the group of B, N, O, Si, S and P and/or may contain aliphatic or aromatic cycles and/or may contain double bonds;

the $R^{13}$ radicals are independently a hydrogen atom or an $R^{11}$ radical;

the $R^{14}$ radicals are independently a divalent linear or branched C1-C21 alkyl radical which may be substituted by one or more heteroatoms selected from the group of B, N, O, Si, S and P and/or may contain aliphatic or aromatic cycles and/or may contain double bonds;

e. optionally a metal catalyst K2 comprising an element selected from groups 4, 8, 12, 13 and 15 of the Periodic Table of the Elements, preferably a metal catalyst comprising Bi, Zn, Zr or Ti;

f. optionally one or more fillers F which may optionally be in surface-treated, especially hydrophobized, form, especially precipitated or fumed silica, precipitated or ground short, ground rubber, glass beads, ground glass, tile, quartzite or clay minerals, especially kaolin;

g. optionally further additions comprising one or more selected from the group of plasticizers, adhesion promoters, retardants, accelerators, defoamers, dispersing aids, wetting auxiliaries, thixotropic agents, biocides, pigments and organic extenders;

wherein the adhesion promoter H has been prepared from at least one epoxide and at least one amine that have been used in a molar ratio of epoxy groups to amine groups of 1:1 to 2:1.

The wavy lines in formulae (II) and (III) represent the sites where these structures are bonded to the guanidine of the formula (I) via a chemical bond.

Substance names beginning with "poly", for example polydimethylsiloxane, in the present document refer to substances containing, in a formal sense, two or more of the functional groups that occur in their name, for example dimethylsiloxane groups, per molecule.

The term "polymer" in the present document firstly encompasses a collective of macromolecules that are chemically uniform but differ in relation to degree of polymerization, molar mass and chain length, said collective having been prepared by a poly reaction (polymerization, polyaddition, polycondensation). The term secondly also encompasses derivatives of such a collective of macromolecules from poly reactions, i.e. compounds which have been obtained by reactions, for example additions or substitutions, of functional groups on defined macromolecules and which may be chemically uniform or chemically nonuniform. The term thus further encompasses what are called prepolymers, i.e. reactive oligomeric preliminary adducts, the functional groups of which are involved in the structure of macromolecules.

"Molecular weight" refers to the molar mass (in g/mol) of a molecule or a molecule residue. "Average molecular weight" refers to the number-average molecular weight ($M_n$) of an oligomeric or polymeric mixture of molecules or molecule residues. It is typically determined by means of gel permeation chromatography (GPC) against polydimethylsiloxane as standard.

The term "viscosity" refers to the dynamic viscosity or shear viscosity which is defined by the ratio between the shear stress and the shear rate (speed gradient) and is determined as described in DIN EN ISO 3219.

A substance or composition is referred to as "storage-stable" or "storable" when it can be stored at room temperature in a suitable container over a prolonged period, typically over at least 3 months to up to 6 months or more, without any change in its application or use properties to a degree of relevance for the use thereof as a result of the storage.

The terms "mass" and "weight" are used synonymously in this document. Thus a "percentage by weight" (% by weight) is a percentage mass fraction which unless otherwise stated relates to the mass (the weight) of the total composition or, depending on the context, of the entire molecule.

"Room temperature" refers to a temperature of 23° C.

All industry standards and official standards mentioned in this document, unless stated otherwise, relate to the version valid at the time of filing of the first application.

The at least one condensation-crosslinkable polydiorganosiloxane P in the silicone composition of the invention is especially a polydiorganosiloxane of the formula (V).

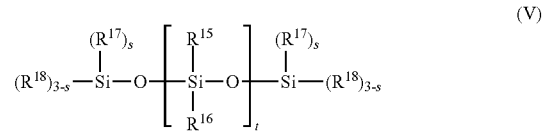

(V)

The $R^{15}$, $R^{16}$ and $R^{17}$ radicals here are independently linear or branched, monovalent hydrocarbyl radicals which have 1 to 12 carbon atoms and optionally include one or more heteroatoms, and optionally one or more C—C multiple bonds and/or optionally cycloaliphatic and/or aromatic components. In particular, the $R^{15}$ and $R^{16}$ radicals are alkyl radicals having 1 to 5, especially 1 to 3, carbon atoms, preferably methyl groups. The $R^{17}$ radicals are independently especially phenyl, vinyl or methyl groups.

The $R^{18}$ radicals are independently hydroxyl, alkoxy, especially methoxy and/or ethoxy, carboxyl, especially acetoxy, ketoxime, amide and/or amino groups which each have 1 to 13 carbon atoms and optionally include one or more heteroatoms, and optionally one or more C—C multiple bonds and/or optionally cycloaliphatic and/or aromatic components.

The index s has a value of 0, 1 or 2, especially 0 or 1.

The index t may be chosen within wide ranges depending on the end use, generally in such a way that a silicone oil is obtained. The index t may, for example, be in the range from 10 to 10 000 and preferably 100 to 1000. The index t is preferably chosen such that the polydiorganosiloxane P has the viscosity specified hereinafter.

The viscosity of the polydiorganosiloxanes P used may vary within wide ranges depending on the end use. The polydiorganosiloxanes P used in accordance with the invention may, at a temperature of 23° C., have a viscosity, for example, of 10 to 500'000 mPa·s, preferably 1000 to 350'000 mPa·s and especially of 6'000 to 120'000 mPa·s.

The viscosities reported here can be determined in accordance with DIN 53018. The measurement can be effected by means of an MCR101 cone-plate viscometer from Anton Paar, Austria, with cone type CP 25-1 at 23° C. The viscosity values reported relate to a shear rate of 0.5 s$^{-1}$.

If the $R^{18}$ radicals are ketoxime groups, they are preferably ketoxime groups each having 1 to 13 carbon atoms and the index s is especially a value of 0. Preferred ketoxime groups here are dialkyl ketoxime groups wherein the alkyl groups each have 1 to 6 carbon atoms. Preferably, the two alkyl groups of the dialkyl ketoxime groups are independently methyl, ethyl, n-propyl, isopropyl, n-butyl or isobutyl groups. Particular preference is given to those cases in which one alkyl group of the dialkyl ketoxime is a methyl group and the other alkyl group of the dialkyl ketoxime is a methyl, ethyl or isobutyl group. Most preferably, the ketoxime group is an ethyl methyl ketoxime group.

Preferably, the $R^{18}$ radicals are hydroxyl groups and the index s is a value of 2. Suitable polydiorganosiloxanes P as shown in formula (V) are known and commercially available. Polydiorganosiloxanes of this kind are also prepared in a known manner as described, for example, in EP0658588.

The two-component silicone composition further comprises one or more monomeric silanes and/or oligomeric siloxanes as crosslinker V for the polyorganosiloxane P, an oligomeric siloxane being a condensation product of monomeric silane crosslinkers. Monomeric silane crosslinkers and also oligomeric condensation products thereof are known as crosslinkers for silicone formulations.

Monomeric silane crosslinkers are generally silane compounds containing two or more, for example three or more and preferably 3 or 4, functional groups. Functional groups are understood here to mean especially groups that can react with functional groups of the polyorganosiloxane to form a bond, the reaction optionally being initiated by hydrolysis, alcoholysis or a different detachment reaction in the functional group of the polydiorganosiloxane and/or the crosslinker. The functional groups may be at any site in the silane crosslinker; they are preferably bonded to a silicon atom of the monomeric silane crosslinker.

Examples of functional groups that a monomeric silane crosslinker may have are alkoxy groups, such as C1 to C5-alkoxy groups, preferably methoxy, ethoxy or propoxy groups, acetoxy groups, amide groups, preferably N-alkylamide groups, especially N-methylbenzamide or N-methylacetamide groups, amine groups, preferably alkylated amine groups, for example cyclohexylamine, but especially dialkylated amine groups, for example N,N-diethylamine, halogen atoms, especially chlorine and/or bromine atoms, and hydrido substituents or oxime groups. As examples of oxime groups, reference is made to the preferred ketoxime groups described above. These functional groups are generally bonded directly to a silicon atom of the monomeric silane crosslinker.

Monomeric silane crosslinkers V may have, for example, one of the following general formulae (VI) to (VIII):

   (VI)

   (VII)

   (VIII)

The $R^{19}$ radical here is independently a linear or branched, monovalent hydrocarbyl radical which has 1 to 12 carbon atoms and optionally includes one or more heteroatoms, and optionally one or more C—C multiple bonds and/or optionally cycloaliphatic and/or aromatic components. Preferred examples of $R^{19}$ are alkyl groups having 1 to 5 carbon atoms, preferably methyl, ethyl or propyl, vinyl, aryl groups, such as phenyl, cycloalkyl groups, such as cyclohexyl, and substituted alkyl groups having 1 to 8 carbon atoms, preferably methyl, ethyl or propyl, which are functionalized with one or more substituents, such as optionally substituted amino ($NH_2$, NHR, $NR_2$, where R is independently alkyl, aryl or cycloalkyl), mercapto, glycidoxy, methacrylate, acrylate or carbamato.

The $R^{20}$ radical is independently a hydroxyl group or an alkoxy, acetoxy or ketoxime group which in each case has 1 to 13 carbon atoms and optionally includes one or more heteroatoms, and optionally one or more C—C multiple bonds and/or optionally cycloaliphatic and/or aromatic components. Preferred ketoxime groups and alkoxy groups have already been described above.

In addition, the index u has a value of 0 to 4, with the proviso that, if u has a value of 3 or 4, at least u-2 $R^{19}$ radicals each have at least one group reactive with the functional groups of the polydiorganosiloxane. In particular, u has a value of 0, 1 or 2, preferably a value of 0 or 1.

$R^{21}$ is a divalent alkylene group, e.g. a C1 to C6-alkylene group, especially methylene, ethylene or hexylene, an arylene group, such as phenylene, or a cycloalkylene group, preference being given to alkylene. The index v is 0, 1 or 2, preferably 1.

For the choice of at least one silane of the formulae (VI)-(VIII) as crosslinker V for polydiorganosiloxanes, different demands on the silicone composition may be crucial. On the one hand, the reactivity of the silane plays an important role, preference being given in principle to more highly reactive silanes. On the other hand, toxicological reasons may also be crucial for the choice of crosslinker. For that reason, preference is given to tetraethoxysilane as crosslinker over tetramethoxysilane, for example, since the volatile alcohol cleavage products that form in the course of crosslinking are of greater toxicological concern in the latter case.

Specific examples of monomeric silane crosslinkers V are methyltrimethoxysilane, chloromethyltrimethoxysilane, vinyltrimethoxysilane, phenyltrimethoxysilane, propyltrimethoxysilane, 3-mercaptopropyltrimethoxysilane, 3-aminopropyltrimethoxysilane, 3-methacryloyloxypropyltrimethoxysilane, 3-glycidoxypropyltrimethoxysilane, 2-aminoethyl-3-aminopropyltrimethoxysilane, 1,2-bis(trimethoxysilyl)ethane, bis(trimethoxysilylpropyl)amine, N-(n-butyl)-3-aminopropyltrimethoxysilane, N-cyclohexylaminomethyltrimethoxysilane, methacryloyloxymethyltrimethoxysilane, O-methylcarbamatomethyltrimethoxysilane or the corresponding compounds in which the methoxy group has been replaced by ethoxy, propoxy, oxime or ketoxime, for example methyltriethoxysilane, vinyltriethoxysilane, phenyltriethoxysilane, methyltripropoxysilane and phenyltripropoxysilane, and also, for example, bis(N-methylacetamido)methylethoxysilane, tris(methylethylketoximo)methylsilane, tris(methylethylketoximo)vinylsilane and tris(methylethylketoximo)phenylsilane. Further examples are tetramethoxysilane, tetraethoxysilane, tetra-n-butoxysilane and tetra-n-propoxysilane.

The oligomeric siloxanes suitable as crosslinker V are condensation products of one or more monomeric silane crosslinkers of this kind. Oligomeric siloxanes of this kind are known and commercially available, for example under the Dynasylan® 1146 or Dynasylan® 6490 trade names from Evonik Degussa GmbH. Oligomers of functional silanes are 3-dimensional compounds of complicated structure. The oligomeric silane may be formed, for example, from hydrolysis and condensation of one or more identical or different monomeric silane crosslinkers.

An oligomeric siloxane of this kind contains functional groups that come from the monomeric silane crosslinkers used for the synthesis thereof. For example, a first condensation of two tetramethoxysilane molecules leads to a dimer containing six functional groups; one functional group in each molecule forms the linkage through condensation. As already set out, the structure of the oligomers formed may be complicated. The number of functional groups in the oligomer can vary according to the degree of condensation, nature of condensation and monomeric silane crosslinker used, but is at least 2, but generally greater, e.g. 4 or more.

For example, suitable oligomeric siloxanes are hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxytetrasiloxane.

The degree of condensation of the oligomeric siloxane, i.e. the number of monomeric silane crosslinkers fused to one another, may vary within wide ranges according to the end use, but may, for example, be within the range from 2 to 200 and preferably from 4 to 50. It will be apparent that the degree of condensation, especially in the case of higher degrees of condensation, is frequently an average.

The crosslinker V used for the silicone composition of the invention may of course also be any mixture of the aforementioned silanes.

The proportion of the crosslinker V for polydiorganosiloxanes is preferably 0.5% to 5% by weight, especially 0.6% to 4% by weight, preferably 0.7% to 3% by weight, of the overall silicone composition.

The silicone composition of the invention further comprises at least one catalyst K1 for the crosslinking of polydiorganosiloxanes, where catalyst K1 is a guanidine described further up by formula (I).

A general catalyst for the crosslinking of polydiorganosiloxanes is capable of catalyzing the hydrolysis and/or condensation of hydrolyzable and/or hydrolyzed silanes, siloxanes and polysiloxanes. In the silicone compositions, these reactions lead, as described in the present invention, to crosslinking of the polydiorganosiloxane chains with the aid of the crosslinkers V present. The compounds suitable as catalyst may, for example, be organic molecules, for instance basic compounds of the formula (I), or metal complexes.

Preferably, the catalyst K1 has two or three guanidine groups per molecule, especially two guanidine groups. Among these diguanidines or triguanidines, particular preference is given to the following structures of the formulae (Ia) to (Ig):

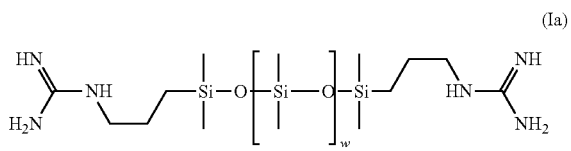

Index w in formula (Ia) is an integer from 1 to 50, preferably 5, 10 or 50.

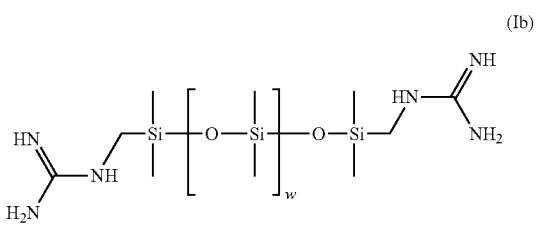

Index w in formula (Ib) is an integer from 1 to 50, preferably 5, 10 or 50.

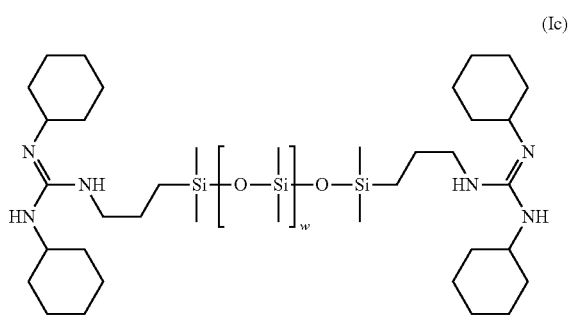

Index w in formula (Ic) is an integer from 1 to 50, preferably 5, 10 or 50.

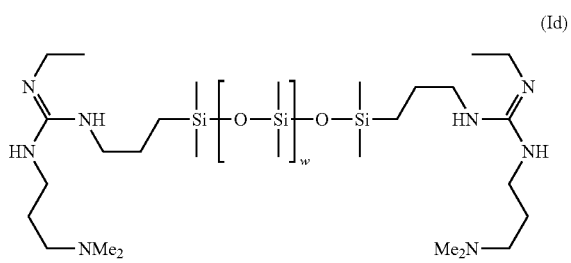

Index w in formula (Id) is an integer from 1 to 50, preferably 5, 10 or 50.

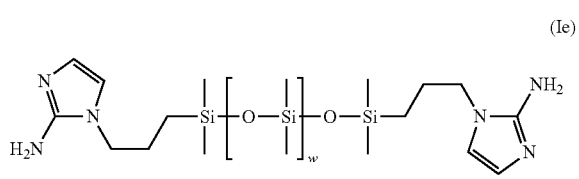

Index w in formula (Ie) is an integer from 1 to 25, preferably 5, 10 or 20.

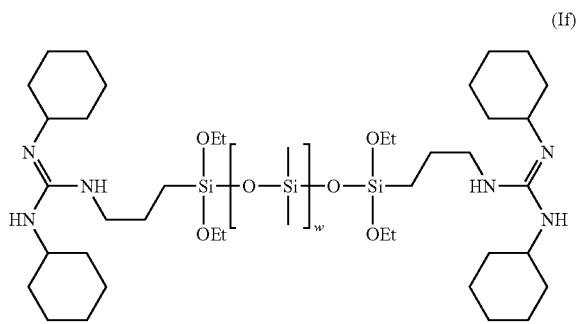

(If)

Index w in formula (If) is an integer from 1 to 50, preferably 5, 10 or 50.

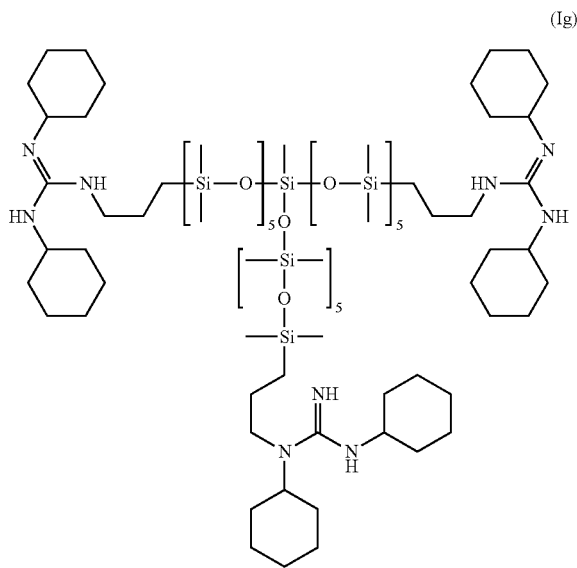

(Ig)

Preferably, catalyst K1 is used in the hardener component B of the two-component silicone composition, with an amount of guanidine groups preferably between 0.5% by weight and 0.6% by weight of vanadium, based on the hardener component B.

In addition, the composition of the invention optionally but preferably comprises a metal catalyst K2 comprising an element selected from groups 4, 8, 12, 13 and 15 of the Periodic Table of the Elements, preferably a metal catalyst comprising Bi, Zn, Zr or Ti.

The catalyst K2 is preferably a bismuthate, a zinc complex, a zirconate or a titanate or organotitanate. These are commercially available. It is also possible and even preferred in certain cases to use mixtures of different catalysts. Most preferred are titanates.

Preferably, the metal catalysts K2 have polydentate, especially bidentate, ligands, for example acetate and other carboxylic acid ligands, for example neodecanoate or octoate ligands, or acetylacetonate or acetamide ligands.

Titanates or organotitanates refer to compounds having at least one ligand bonded to the titanium atom via an oxygen atom. Suitable ligands bonded to the titanium atom via an oxygen-titanium bond are, for example, those selected from an alkoxy group, sulfonate group, carboxylate group, dialkylphosphate group, dialkylpyrophosphate group and acetylacetonate group. Preferred titanates are, for example, tetrabutyl or tetraisopropyl titanate. Further suitable titanates have at least one polydentate ligand, also called chelate ligand. In particular, the polydentate ligand is a bidentate ligand.

Suitable titanates are commercially available, for example, under the Tyzor® AA, GBA, GBO, AA-75, AA-65, AA-105, DC, BEAT, IBAY trade names, commercially available from Dorf Ketal, or under the Tytan™ PBT, TET, X85, TAA, ET, S2, S4 or S6 trade names, commercially available from Borica.

Suitable zinc complexes are especially Zn(II) complexes with polydentate ligands, for example Zn(II) acetamide complexes or Zn(II) acetate.

Also preferred are zirconates and bismuthates.

Suitable zirconates are commercially available, for example, under the Tyzor® NBZ, NPZ, TEAZ, 212, 215, 217, 223 trade names from Dorf Ketal or under the K-Kat 4205 or K-Kat XC-6212 trade names from King Industries.

Bismuthates that are the most preferred are bismuth carboxylates. The bismuth carboxylates are preparable from Bi(III) compounds with the organic acids R—COOH by the literature methods or are obtainable as commercial products under the respective brand names, such as bismuth trioctoate or bismuth trineodecanoate, for example under the brand names Borchi® Kat (from Borchers GmbH) or Tegokat® (from Goldschmidt TIB GmbH), Neobi® 200, from Shepherd, or Coscat®, from Caschem.

Further suitable bismuthates are available, for example, under the K-Kat 348 and K-Kat XC-8203 brand name from King Industries.

The proportion by weight of catalyst K2 is preferably 0.1 to 6 parts by weight, especially 0.2 to 5 parts by weight, preferably 0.5 to 3 parts by weight, based on 100 parts by weight of polydiorganosiloxane P in the overall silicone composition.

The composition of the invention does not contain any organotin compounds. This means that organotin compounds are present to an extent of at most 0.1% by weight, preferably at most 0.05% by weight, especially at most 0.01% by weight, based on the overall composition. Most preferably, organotin compounds are not detectable in the composition by standard analysis methods.

The silicone composition of the invention further comprises at least one adhesion promoter H of the formula (IV) shown further up.

The adhesion promoter H is a substituted ethylene glycol which is prepared via synthesis routes known to those skilled in the art from epoxides and primary or secondary amines via an epoxy-amine addition reaction. Preferably, adhesion promoter H comprises at least one reactive silane group, especially alkoxysilane group, preferably a methoxy- and/or ethoxysilane group. Most preferred among these are dialkoxy- and trialkoxysilane groups, especially trialkoxysilane groups such as trimethoxysilane groups and/or triethoxysilane groups.

Particularly preferred raw materials for the preparation of the adhesion promoter H are epoxy-functional silanes and amino-functional silanes, for example 3-aminopropyltrimethoxysilane, 3-glycidoxypropyltrimethoxysilane, 2-aminoethyl-3-aminopropyltrimethoxysilane, bis(trimethoxysilylpropyl)amine, N-(n-butyl)-3-aminopropyltrimethoxysilane and N-cyclohexylaminomethyltrimethoxysilane, and the corresponding compounds with ethoxy groups rather than methoxy groups. These raw materials permit the preparation of particularly suitable adhesion promoters H because the raw materials are readily and inexpensively available, the resulting adhesion promoters H enable very good promotion of adhesion by virtue of the amine and hydroxyl groups present and, by virtue of the reactive silane groups, can also react with the polydiorganosiloxane P and other silane-functional constituents of the composition of the invention and hence give a stable bond to the cured composition.

Preferably, adhesion promoter H is prepared beforehand and is added as a finished reaction product to the composition of the invention. However, it is also possible to add the raw materials, for example amines and epoxides, to the composition of the invention as individual substances, whereupon the adhesion promoter H forms in situ. However, preparation beforehand is preferred.

In a preferred embodiment, the adhesion promoter H is prepared from at least one epoxysilane and at least one aminosilane.

The adhesion promoter H is prepared from amines, for example aminosilanes, and epoxides, for example glycidylsilanes, and a molar ratio of epoxy groups to amine groups of 1:1 to 2:1 is chosen, especially a ratio of 2:1.

Adhesion promoters H of the general formula (IV) are normally mixtures of individual substances, for example mixtures of oligomeric or polymeric substances comprising multiple individual structures of the general formula (IV).

The amount of adhesion promoter H in the composition of the invention is preferably between 5% and 25% by weight, especially between 7% and 20% by weight, more preferably between 10% and 15% by weight, based on the hardener component B.

Based on the overall composition, the preferred content of adhesion promoter H is between 0.5% and 2.5% by weight, especially between 0.7% and 2% by weight, more preferably between 1% and 1.5% by weight.

Particularly preferred adhesion promoters H are the following structures of the formulae (IVa) to (IVq):

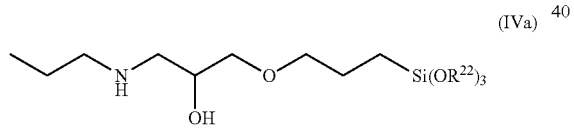
(IVa)

$R^{22}$ radical in formula (IVa) is a methyl or ethyl group.

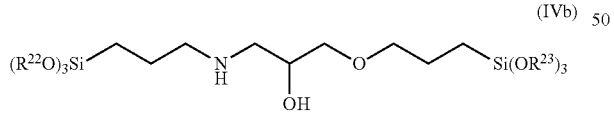
(IVb)

$R^{22}$ and $R^{23}$ radicals in formula (IVb) are independently a methyl or ethyl group.

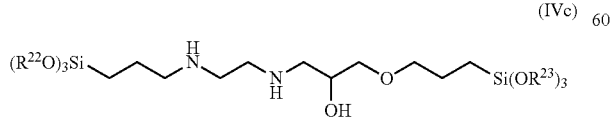
(IVc)

$R^{22}$ and $R^{23}$ radicals in formula (IVc) are independently a methyl or ethyl group.

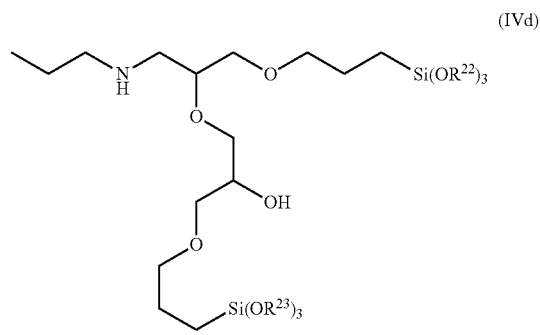
(IVd)

$R^{22}$ and $R^{23}$ radicals in formula (IVd) are independently a methyl or ethyl group, preferably each a methyl group or each an ethyl group.

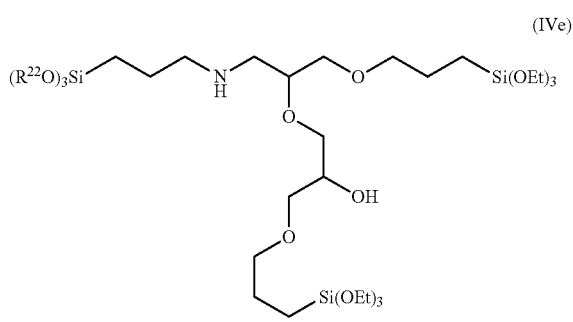
(IVe)

$R^{22}$ radical in formula (IVe) is a methyl or ethyl group.

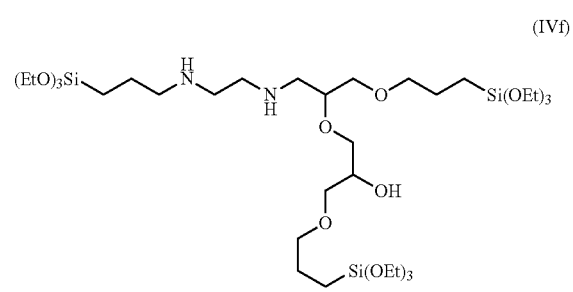
(IVf)

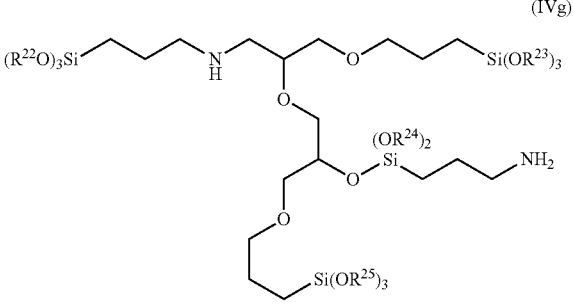
(IVg)

$R^{22}$, $R^{23}$, $R^{24}$ and $R^{25}$ radicals in formula (IVg) are independently a methyl or ethyl group, preferably each a methyl group or each an ethyl group or $R^{22}$ and $R^{24}$ are a methyl group and $R^{23}$ and $R^{25}$ are an ethyl group.

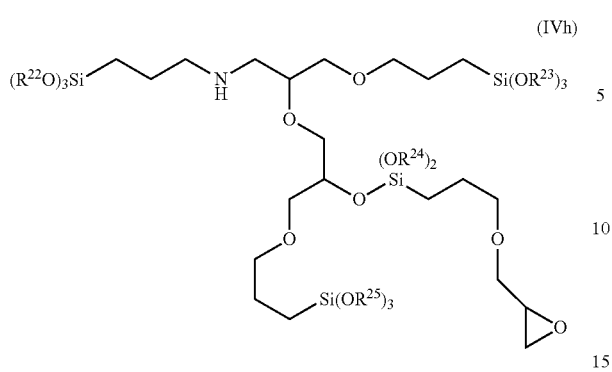
(IVh)

$R^{22}$, $R^{23}$, $R^{24}$ and $R^{25}$ radicals in formula (IVh) are independently a methyl or ethyl group, preferably each a methyl group or each an ethyl group or $R^{23}$ and $R^{24}$ and $R^{25}$ are a methyl group and $R^{22}$ is an ethyl group.

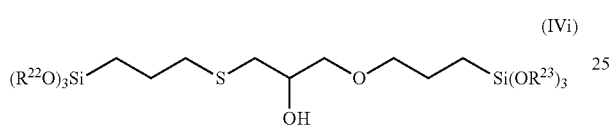
(IVi)

$R^{22}$ and $R^{23}$ radicals in formula (IVi) are independently a methyl or ethyl group.

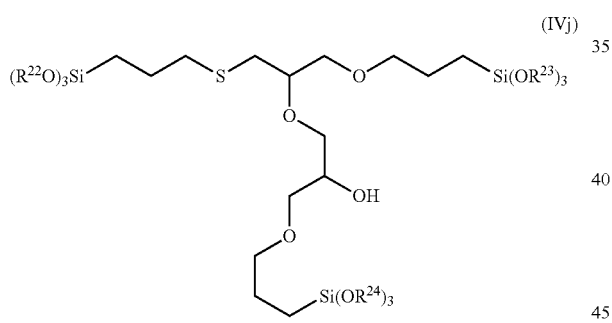
(IVj)

$R^{22}$, $R^{23}$ and $R^{24}$ radicals in formula (IVj) are independently a methyl or ethyl group, preferably each a methyl group or each an ethyl group.

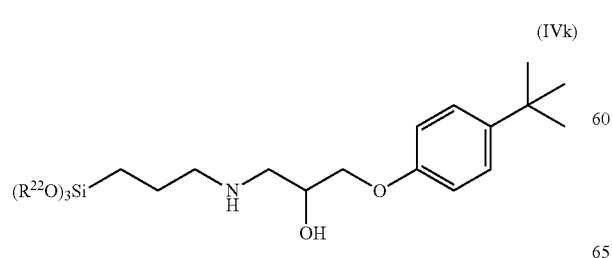
(IVk)

$R^{22}$ radical in formula (IVk) is a methyl or ethyl group.

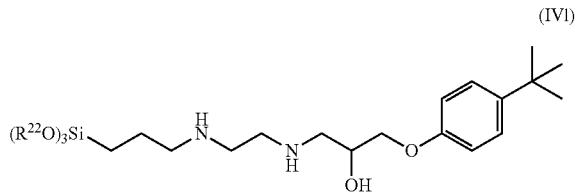
(IVl)

$R^{22}$ radical in formula (IVl) is a methyl or ethyl group.

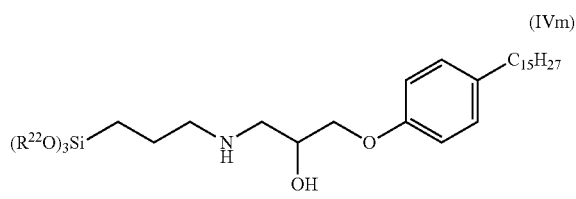
(IVm)

$R^{22}$ radical in formula (IVm) is a methyl or ethyl group.

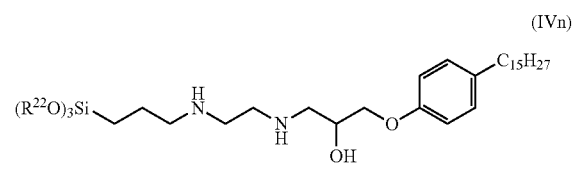
(IVn)

$R^{22}$ radical in formula (IVn) is a methyl or ethyl group.

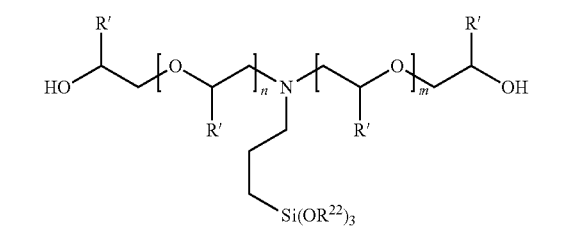
(IVo)

$R^{22}$ radical in formula (IVo) is a methyl or ethyl group. The R' radicals in formula (IVo) are independently a hydrogen atom or one of the two radicals shown in the formula (IVo'):

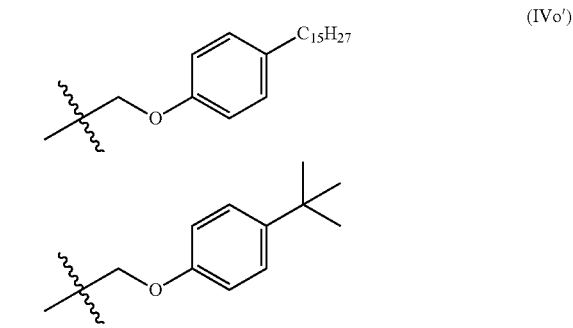
(IVo')

The indices m and n in formula (IVo) are independently an integer value from 0 to 16.

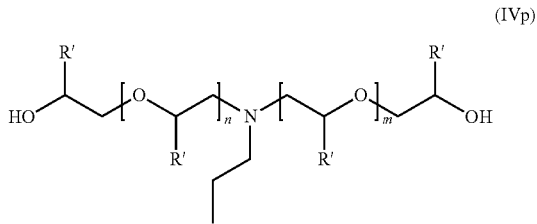
(IVp)

The R' radicals in formula (IVp) are independently a hydrogen atom or a radical of the formula (IVp'), with the proviso that at least one R' radical of the formula (IVp) is a radical of the formula (IVp'):

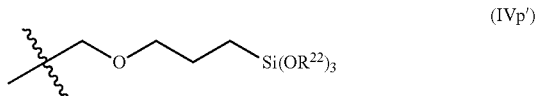
(IVp')

$R^{22}$ radical in formula (IVp') is a methyl or ethyl group. The indices m and n in formula (IVp) are independently an integer value from 0 to 16.

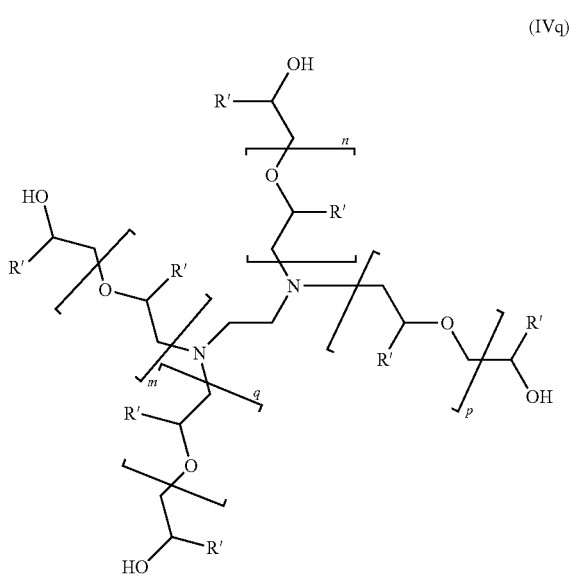
(IVq)

The R' radicals in formula (IVq) are independently a hydrogen atom or a radical of the formula (IVq'), with the proviso that at least one R' radical of the formula (IVq) is a radical of the formula (IVq'):

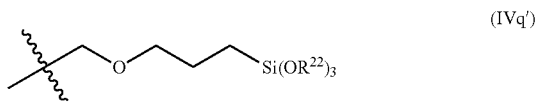
(IVq')

$R^{22}$ radical in formula (IVq') is a methyl or ethyl group. The indices m, n and p in formula (IVq) are independently an integer value from 0 to 16.

The wavy lines in formulae (IVo'), (IVp') and (VIq') represent the sites where these structures are bonded in place of the R' radical in the formulae (IVo), (IVp) and (IVq) via a chemical bond.

The silicone composition of the invention optionally but preferably further comprises one or more fillers F which may optionally be in surface-treated, especially hydrophobized, form, especially precipitated or fumed silica, precipitated or ground short, ground rubber, glass beads, ground glass, tile, quartzite or clay minerals, especially kaolin.

Suitable fillers F are all fillers known to the person skilled in the art in the field of formulation of silicone compositions.

A preferred filler F is chalk, especially calcium carbonate, for example in the form of limestone, chalk, shell lime or marble. The calcium carbonate here may have been obtained from natural sources, for example marble quarries, or produced by known methods, for example precipitation reactions. Natural calcium carbonate may contain proportions of further minerals, e.g. magnesium carbonate. Moreover, the calcium carbonate may have been ground and it may be in untreated or modified form, especially in surface-treated, i.e. hydrophobized, form. The surface treatment can be effected, for example, by treatment with fatty acids, especially stearates, preferably with calcium stearate. It is of course also possible to use mixtures of different calcium carbonates.

A further preferred filler F is silica.

Suitable silicas are precipitated or fumed silicas that may have been surface-hydrophobized or may be in untreated, i.e. hydrophilic, form.

Suitable hydrophobized silicas are typically siliconized and/or silanized silicas that then have a carbon content of 0.6% to 6.5% by weight, based on the total weight of the silica. Suitable silicas may alternatively be in untreated, i.e. hydrophilic, form. It is additionally also possible to use mixtures of different silicas.

The at least one filler F present with preference in the composition of the invention affects both the rheological properties of the uncured composition and the mechanical properties and surface characteristics of the cured composition. It is possible and even advantageous in preferred embodiments to combine different fillers in the silicone composition of the invention.

Examples of suitable further fillers are organic or inorganic fillers that may have been coated with fatty acids, especially stearic acid, calcined kaolins, aluminas, aluminum hydroxides, carbon black, especially industry produced carbon black, aluminum silicates, magnesium aluminum silicates, zirconium silicates, quartz flour, cristobalite flour, diatomaceous earth, mica, iron oxides, titanias, zirconias, gypsum, annaline, barium sulfate, boron carbide, boron nitride, graphite, carbon fibers, zeolites, glass fibers or glass beads, the surface of which may have been treated with a hydrophobizing agent. Preferred further fillers are calcined kaolins, carbon black, and flame-retardant fillers such as hydroxides or hydrates, especially hydroxides or hydrates of aluminum, preferably aluminum trihydroxide.

A total amount of filler F in preferred embodiments of the silicone composition of the invention is typically in the range from 10% to 70% by weight, preferably 15% to 60% by weight, more preferably 20% to 50% by weight, based on the total weight of the composition.

The silicon composition of the invention may optionally comprise further constituents.

Additional constituents of this kind are especially auxiliaries, for example adhesion promoters, processing auxiliaries, leveling aids, stabilizers, dyes, pigments, plasticizers, fragrances, biocides, thixotropic agents, rheology modifiers, phosphates, inhibitors, heat stabilizers, antistats, flame retardants, free-radical scavengers, waxes and other commonly used raw materials and additives that are known to the person skilled in the art.

Any or all of the abovementioned auxiliaries or others that are not mentioned may be present in the silicone composition of the invention, and every single one of the auxiliaries additionally present is preferably present with a proportion of less than 25 parts by weight, more preferably less than 15 parts by weight, most preferably less than 10 parts by weight, based on 100 parts by weight of all polydiorganosiloxanes P present in the composition.

When optional constituents of this kind are used, it is advantageous to select all the constituents mentioned that may be present in the silicone composition so as to not adversely affect the storage stability of the silicone composition by virtue of the presence of such a constituent, meaning that the properties of the composition, especially the application and curing properties, are altered only slightly, if at all, in the course of storage. This means that reactions that lead to chemical curing of the silicone composition described do not occur to a significant degree during storage. It is therefore especially advantageous that the constituents mentioned contain, or release in the course of storage, no water or traces of water at most. It may therefore be advisable to subject certain constituents to chemical or physical drying before mixing them into the composition.

Suitable plasticizers for the silicone composition of the invention are especially trialkylsilyl-terminated polydialkylsiloxanes, especially trimethylsilyl-terminated polydimethylsiloxanes. Preference is given to trimethylsilyl-terminated polydimethylsiloxanes having viscosities between 1 and 10'000 mPa·s. Particular preference is given to viscosities between 10 and 1'000 mPa·s. However, it is also possible to use trimethylsilyl-terminated polydimethylsiloxanes in which some of the methyl groups have been replaced by other organic groups, for example phenyl, vinyl or trifluoropropyl. Even though particular preference is given to using linear trimethylsilyl-terminated polydimethylsiloxanes as plasticizers, it is also possible to use compounds that are branched. It is also possible, rather than the polysiloxane plasticizers, to use organic compounds, for example particular hydrocarbons or mixtures thereof, as plasticizers. Hydrocarbons of this kind may be aromatic or aliphatic. In the selection, it should be ensured particularly that these hydrocarbons have low volatility and sufficient compatibility with the other constituents of the silicone composition.

The proportion of the plasticizer is preferably 2% to 35% by weight, especially 5% to 25% by weight, of the overall silicone composition.

Particularly suitable adhesion promoters that may be present in addition to the adhesion promoter H in the composition of the invention are alkoxysilanes that are preferably substituted by functional groups. The functional group is, for example, an aminopropyl, glycidoxypropyl or mercaptopropyl group. Preference is given to amino-functional groups. The alkoxy groups of such silanes are usually a methoxy or ethoxy group. Particular preference is given to aminopropyltrimethoxysilane, 3-aminopropyltriethoxysilane, 3-(2-aminoethyl)aminopropyltriethoxysilane and 3-mercaptopropyltriethoxysilane. It is also possible to use a mixture of adhesion promoters. Further suitable adhesion promoters are, for example, also amino-functional alkylsilsesquioxanes such as amino-functional methylsilsesquioxane or amino-functional propylsilsesquioxane, alkoxylated alkyleneamines, especially ethoxylated and/or propoxylated alkylenediamines, and further, especially substituted, oligomers, polymers or copolymers based on polyalkylene glycols. It will be clear to the person skilled in the art that it is possible in the case of use of silanes as adhesion promoters that these may be in partly or fully hydrolyzed form according to the conditions, for example in the presence of moisture. It is also known to the person skilled in the art that, in the presence of such partly or fully hydrolyzed silanes, condensation reactions can result in formation of oligomeric siloxanes, especially to give dimers and/or trimers.

The proportion of any adhesion promoter additionally present in addition to the adhesion promoter H is preferably 0.1% to 15% by weight, especially 0.5% to 10% by weight, preferably 1% to 5% by weight, of the overall two-component silicone composition.

A further aspect of the present invention is the production of a material comprising a composition of the invention as described above by continuous, semicontinuous or batchwise mixing of the individual constituents in dissolvers, internal mixers, forced mixers, planetary mixers, mixing tubes or extruders.

The two-component composition of the invention is especially a two-component silicone composition consisting of a component A and a component B, wherein the polydiorganosiloxane P, the adhesion promoter H, the crosslinker V and the catalyst K1, and any further constituents present, are divided between the two components such that the crosslinking reaction sets in only on mixing or after the mixing of the two components.

More particularly, the two-component silicone composition consists of a polymer component A comprising
the at least one reactive polydiorganosiloxane polymer P,
preferably an optionally hydrophobized filler F,
preferably at least one plasticizer;
and a hardener component B comprising
the at least one crosslinker V for polydiorganosiloxanes,
the catalyst K1,
the adhesion promoter H,
preferably an optionally hydrophobized filler F,
preferably at least one plasticizer.

Both component A and component B of the two-component silicone composition described are produced and stored with exclusion of moisture. Separately from one another, the two components are storage-stable, meaning that they can be stored in a suitable package or arrangement over a period of several months to up to a year or longer without any change in their use properties or in their properties after curing to a degree of relevance for their use. Typically, the storage stability is ascertained by the measurement of the viscosity or of the reactivity over time.

In the application of the two-component silicone composition, components A and B are mixed with one another, for example by stirring, kneading, rolling or the like, but especially by means of a static mixer, which results in curing of the composition. The two-component silicone composition is especially cured at room temperature.

More particularly, silicone formulations of the invention can be processed with standard equipment for pumping, mixing and dosing of RTV-2 silicones, for example hydraulically operated scoop pumps such as Reinhardt-Technik Ecostar 250.

The two-component silicone composition of the invention is especially used in such a way that the weight ratio of component A to component B is 1:1, especially from 3:1 to 15:1, preferably from 7:1 to 13:1.

As reaction products of the condensation reaction, the crosslinking of the silicone composition especially also gives rise to compounds of the formula HO—$R^4$ where $R^4$ has already been described above. Preferably, these by-products of the condensation reaction are compounds that impair neither the composition nor the substrate to which the composition is applied. Most preferably, the reaction product of the formula HO—$R^4$ is a compound that volatilizes readily out of the crosslinking or already crosslinked composition.

The present invention further relates to the use of a silicone composition as described above as adhesive, sealant, coating or casting compound.

The present invention further relates to a cured silicone composition obtainable from an above-described two-component silicone composition by mixing component A with component B.

A two-component composition of the invention can be used as adhesive or sealant in a method of bonding or joining substrates. The method of the invention comprises a) the mixing of component B into component A to obtain a mixture, b) the application of the mixture to a substrate and contacting of the mixture applied to the substrate with a further substrate in order to obtain an adhesive bond between the substrates, or the introducing of the mixture into a gap between two substrates in order to obtain a join between the substrates, and c) the curing of the mixture, wherein the mixing-in in step a) is conducted before or during the application or introduction in step b).

The components of the two-component composition of the invention are stored separately from one another for storage. The mixing of components A and B in step a) can be effected in a customary manner, for example by stirring component B into component A, which can be effected manually or with the aid of a suitable stirring apparatus, for example with a static mixer, dynamic mixing, Speedmixer, dissolver etc. For the application or introduction, the two components can also be expressed from the separate storage containers, for example with gear pumps, and mixed. The mixing can be effected, for example, in feed conduits or nozzles for the application or introduction, or directly on the substrate or in the gap.

The mixing-in in step a) can thus be conducted before or during the application or introduction in step b). The mixing should be effected relatively shortly before the further processing since the mixing commences the curing process.

Application to a substrate or introduction into a gap between substrates in step b) can be effected in a customary manner, for example manually or in an automated process with the aid of robots. On bonding, the substrate provided with the mixture is contacted with a further substrate, optionally under pressure, in order to obtain an adhesive bond between the substrates. Thereafter, the mixture is left to cure in step c), usually at room temperature, in order to achieve the bonding or joining of the substrates. In this way, the adhesive-bonded or joined substrates of the invention are obtained with the cured mixture of components A and B as adhesive or sealant material.

The substrates to be bonded, coated or joined may be of the same material or a different material. It is possible to bond, seal, coat or join any customary materials with the two-component composition of the invention. Preferred materials for coating, sealing, bonding or joining are glass, glass ceramic, metals, for example aluminum, copper, steel or stainless steel, concrete, mortar, rocks, for example sandstone, brick, tile, ceramic, gypsum, natural rocks such as granite or marble and calcareous sandstone, asphalt, bitumen, plastics, for example polyolefins, PVC, Tedlar, PET, polyamide, polycarbonate, polystyrene or poly(meth)acrylate, polyester, epoxy resin and composite materials such as CFRP, and painted or varnished surfaces.

The one- or two-component silicone formulations of the invention, preferably in the form of an RTV silicone, are especially suitable as elastic sealants and adhesives, coatings or potting compounds. A suitable field of use is, for example, the bonding, coating or sealing of articles made of glass, metal, e.g. aluminum, copper or stainless steel, or plastic, e.g. PVC, polyamide, polycarbonate or PET, and other materials as described above. The silicone formulations of the invention are more preferably used as adhesives or sealants, for example in the following sectors: construction, for example window and facade fitting, the sanitary sector, the automotive sector, solar power, wind power, white, brown or red goods, electronics, and boat- and shipbuilding.

EXAMPLES

Working examples are adduced hereinafter, which are intended to elucidate the invention described in detail. It will be appreciated that the invention is not restricted to these described working examples.

Example 1—Preparation of a Diguanidino-PDMS Catalyst 1,1'-(α,ω-n-propylpoly(dimethylsiloxane))-bis(2,3-dicyclohexylguanidine)

In a round-bottom flask, 16.90 g of α,ω-bis(3-aminopropyl)poly(dimethylsiloxane) having an average molecular weight of about 1050 g/mol (Wacker AMinol SLM 92503, Wacker; amine value 109 mg KOH/g) and 6.18 g of N,N'-dicyclohexylcarbodiimide are mixed and the mixture is heated to 120° C. while stirring. At regular intervals, the reaction mixture was analyzed by means of FT-IR spectroscopy. After 17 hours, the carbodiimide band at about 2120 $cm^{-1}$ had disappeared completely. This gave a colorless, odorless oil having a viscosity at 20° C. of 436 cP.

FT-IR: 2961, 2930, 2855, 1647 (C=N), 1449, 1411, 1364, 1258, 1011, 862, 788, 700 $cm^{-1}$.

Example 2—Preparation of the Zn-Acetamide Catalyst 316.4 g of ethyl 3-oxohexanoate and 310.18 g of dibutylamine were weighed into a 1 L round-bottom flask. This mixture was then put on a rotary evaporator at 110° C. and 300 mbar for 26 h. Thereafter, the vacuum was reduced to the minimum. The intermediate (=ligand) was then purified by means of vacuum distillation (120° C., 0.5 mbar).

11.10 g of zinc acetylacetonate hydrate were dried under high vacuum at 80° C. overnight, resulting in 10.023 g of zinc acetylacetonate (white powder). 20.06 g of ligand (2.19 eq.) were added to the powder and the mixture was heated to 100° C. for 4 h. Thereafter, the temperature was reduced to 60° C. and was maintained under high vacuum overnight. The result is a yellowish oil with zinc content 11%.

Example 3 Describes the Preparation of a Polymer Component A

The exact composition of the polymer component A (example 3), in % by weight, based on the overall component A, is shown in table 1.

TABLE 1

All figures in % by weight, based on the polymer component A.

| | Example 3 (polymer component A) |
|---|---|
| FD 20 polymer | 44.44 |
| AK 100 silicone oil | 8.89 |
| Carbital 110 | 26.67 |
| Hakuenka CCR-S10 | 20.00 |

Example 3—Preparation of the Polymer Component A

In a 5 L planetary mixer (Hermann Linden Maschinenfabrik), dihydroxy-terminated PDMS having a viscosity of 20'000 cP (1500 g, FD 20 polymer—Wacker Chemie, Germany) was mixed with a di-TMS-terminated PDMS having a viscosity of 100 cP (300 g) for 5 min (dissolver speed: 300 rpm, kneader speed: 70 rpm). Ground calcium carbonate (900 g, Carbital 110, Imerys) was added at reduced mixing speed. On completion of addition, the mixing speed was restored (dissolver: 300 rpm, kneader: 70 rpm) and maintained for 5 min. The mixing speed was reduced again and precipitated calcium carbonate (675 g, Hakuenka CCR-S10, Omya) was added. The mixture was homogenized at 400 rpm (dissolver) and 80 rpm (kneader) under reduced pressure (100 mbar) for 5 min. The polymer component was transferred to polypropylene cartridges and stored at 23° C.

Examples 4 to 12 Describe the Production of Various Inventive and Noninventive Hardener Components B The exact composition of these hardener components B (examples 4 to 12), in % by weight, based on the overall respective hardener component B, is shown in tables 2 and 3.

TABLE 2

All figures in % by weight, based on the respective hardener component B.

| | Ex. 4 | Ex. 5 | Ex. 6 | Ex. 7 |
|---|---|---|---|---|
| 20000 silicone oil | 36.97 | 32.48 | 32.48 | 32.48 |
| Silica dispersion | 11.01 | 11.01 | 11.01 | 11.01 |
| Dynasylan A | 9.17 | 9.17 | 9.17 | 9.17 |
| Dynasylan 40 | 22.02 | 22.02 | 22.02 | 22.02 |
| Monarch 460 | 7.34 | 7.34 | 7.34 | 7.34 |
| Geniosil GF 80 | 6.61 | | 4.40 | 8.81 |
| Geniosil GF 94 | 6.61 | 13.21 | 8.81 | 4.40 |
| Dibutyltin diacetate | 0.28 | | | |
| Zn cat. (ex. 2) | | 0.55 | 0.55 | 0.55 |
| Guanidine cat. (ex. 1) | | 4.22 | 4.22 | 4.22 |

TABLE 3

All figures in % by weight, based on the respective hardener component B.

| | Ex. 8 | Ex. 9 | Ex. 10 | Ex. 11 | Ex. 12 |
|---|---|---|---|---|---|
| 20000 silicone oil | 32.48 | 32.48 | 32.48 | 36.70 | 33.03 |
| Silica dispersion | 11.01 | 11.01 | 11.01 | 11.01 | 11.01 |
| Dynasylan A | 9.17 | 9.17 | 9.17 | 9.17 | 9.17 |
| Dynasylan 40 | 22.02 | 22.02 | 22.02 | 22.02 | 22.02 |
| Monarch 460 | 7.34 | 7.34 | 7.34 | 7.34 | 7.34 |
| Geniosil GF 80 | 10.57 | | 8.81 | 6.61 | 8.81 |
| Geniosil GF 94 | | 5.62 | 4.40 | 6.61 | 4.40 |
| Propylamine | 2.64 | | | | |
| Ultra LITE 513 | | 7.59 | | | |
| Zn cat. (ex. 2) | 0.55 | 0.55 | | 0.55 | |
| Tetrakis-isopropoxytitanium | | | 0.55 | | |
| Guanidine cat. (ex. 1) | 4.22 | 4.22 | 4.22 | | 4.22 |

Example 4 (Comparative Example)

A Speed-mixer (DAC 600.1 VAC-P—Hauschild, 2000 rpm, 20 sec) was used to mix silicone oil having a viscosity of 20'000 cP (110 g) with a silica dispersion (32.8 g, 40% silica (150 m²/g) in silicone oil). Thereafter, TEOS (27.3 g, Dynasylan A, Evonik) and oligo-TEOS (65.5 g, Dynasylan 40, Evonik) were added and the mixture was mixed again (2000 rpm, 20 sec). Thereafter, carbon black (21.8 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (39.3 g, Geniosil GF 80:Geniosil GF 94 (1:1), Wacker) was followed by mixing (2000 rpm, 20 sec). Finally, the catalyst was added (0.82 g, dibutyltin diacetate) and mixed under reduced pressure (2000 rpm, 20 s, 200 mbar). The finished hardener component was transferred into a polypropylene cartridge and stored at 23° C.

Example 5 (Comparative Example)

A Speed-mixer (DAC 600.1 VAC-P—Hauschild, 2000 rpm, 20 sec) was used to mix silicone oil having a viscosity of 20'000 cP (120 g) with a silica dispersion (40.7 g). Thereafter, TEOS (33.9 g, Dynasylan A, Evonik) and oligo-TEOS (81.4 g, Dynasylan 40, Evonik) were added and the mixture was mixed again (2000 rpm, 20 sec). Thereafter, carbon black (27.1 g, Monarch 460, Cabot) was roughly incorporated manually, followed by mixing again on the Speed-mixer (2000 rpm, 20 sec). Addition of the adhesion promoter (48.8 g, Geniosil GF 94, Wacker) was followed by mixing (2000 rpm, 20 sec). Finally, the metal catalyst (2.03 g, according to example 2) and the guanidine catalyst (15.6 g, according to example 1) were added. Mixing was effected under reduced pressure (2000 rpm, 20 s, 200 mbar). The finished hardener component was transferred into a polypropylene cartridge and stored at 23° C.

Example 6 (Comparative Example)

A Speed-mixer (DAC 600.1 VAC-P—Hauschild, 2000 rpm, 20 sec) was used to mix silicone oil having a viscosity of 20'000 cP (100 g) with a silica dispersion (33.9 g). Thereafter, TEOS (28.3 g, Dynasylan A, Evonik) and oligo-TEOS (67.8 g, Dynasylan 40, Evonik) were added and the mixture was mixed again (2000 rpm, 20 sec). Thereafter, carbon black (22.6 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (40.7 g, Geniosil GF 80:Geniosil GF 94 (1:2), Wacker) was followed by mixing (2000 rpm, 20 sec). Finally, the metal catalyst (1.69 g, according to example 2) and the guanidine catalyst (13.0 g, according to example 1) were added. Mixing was effected under reduced pressure (2000 rpm, 20 s, 200 mbar). The finished hardener component was transferred into a polypropylene cartridge and stored at 23° C.

Example 7

A Speed-mixer (DAC 600.1 VAC-P—Hauschild, 2000 rpm, 20 sec) was used to mix silicone oil having a viscosity of 20'000 cP (100 g) with a silica dispersion (33.9 g). Thereafter, TEOS (28.3 g, Dynasylan A, Evonik) and oligo-TEOS (67.8 g, Dynasylan 40, Evonik) were added and the mixture was mixed again (2000 rpm, 20 sec). Thereafter, carbon black (22.6 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (40.7 g, Geniosil GF 80:Geniosil GF 94 (2:1), Wacker) was followed by mixing (2000 rpm, 20 sec). Finally, the metal catalyst (1.69 g, according to example 2) and the guanidine catalyst (13.0 g, according to example 1) were added. Mixing was effected under reduced pressure (2000 rpm, 20 s, 200 mbar). The finished hardener component was transferred into a polypropylene cartridge and stored at 23° C.

Example 8

A Speed-mixer (DAC 600.1 VAC-P—Hauschild, 2000 rpm, 20 sec) was used to mix silicone oil having a viscosity of 20'000 cP (100 g) with a silica dispersion (33.9 g). Thereafter, TEOS (28.3 g, Dynasylan A, Evonik) and oligo-TEOS (67.8 g, Dynasylan 40, Evonik) were added and the mixture was mixed again (2000 rpm, 20 sec). Thereafter, carbon black (22.6 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (40.7 g, Geniosil GF 80 (Wacker):propylamine (4:1)) was followed by mixing (2000 rpm, 20 sec). Finally, the metal catalyst (1.69 g, according to example 2) and the guanidine catalyst (13.0 g, according to example 1) were added. Mixing was effected under reduced pressure (2000 rpm, 20 s, 200 mbar). The finished hardener component was transferred into a polypropylene cartridge and stored at 23° C.

Example 9

A Speed-mixer (DAC 600.1 VAC-P—Hauschild, 2000 rpm, 20 sec) was used to mix silicone oil having a viscosity of 20'000 cP (100 g) with a silica dispersion (33.9 g). Thereafter, TEOS (28.3 g, Dynasylan A, Evonik) and oligo-TEOS (67.8 g, Dynasylan 40, Evonik) were added and the mixture was mixed again (2000 rpm, 20 sec). Thereafter, carbon black (22.6 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (40.7 g, Ultra LITE 513 (Cardolite):Geniosil GF 94 (Wacker) (4:3)) was followed by mixing (2000 rpm, 20 sec). Finally, the metal catalyst (1.69 g, according to example 2) and the guanidine catalyst (13.0 g, according to example 1) were added. Mixing was effected under reduced pressure (2000 rpm, 20 s, 200 mbar). The finished hardener component was transferred into a polypropylene cartridge and stored at 23° C.

Example 10

A Speed-mixer (DAC 600.1 VAC-P—Hauschild, 2000 rpm, 20 sec) was used to mix silicone oil having a viscosity of 20'000 cP (100 g) with a silica dispersion (33.9 g). Thereafter, TEOS (28.3 g, Dynasylan A, Evonik) and oligo-TEOS (67.8 g, Dynasylan 40, Evonik) were added and the mixture was mixed again (2000 rpm, 20 sec). Thereafter, carbon black (22.6 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (40.7 g, Geniosil GF 80:Geniosil GF 94 (2:1), Wacker) was followed by mixing (2000 rpm, 20 sec). Finally, the metal catalyst (1.69 g, tetrakisisopropoxytitanium) and the guanidine catalyst (13.0 g, according to example 1) were added. Mixing was effected under reduced pressure (2000 rpm, 20 s, 200 mbar). The finished hardener component was transferred into a polypropylene cartridge and stored at 23° C.

Example 11

A Speed-mixer (DAC 600.1 VAC-P—Hauschild, 2000 rpm, 20 sec) was used to mix silicone oil having a viscosity of 20'000 cP (110 g) with a silica dispersion (33.0 g). Thereafter, TEOS (27.5 g, Dynasylan A, Evonik) and oligo-TEOS (66.0 g, Dynasylan 40, Evonik) were added and the mixture was mixed again (2000 rpm, 20 sec). Thereafter, carbon black (22.0 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (39.6 g, Geniosil GF 80:Geniosil GF 94 (1:1), Wacker) was followed by mixing (2000 rpm, 20 sec). Finally, the catalyst was added (1.65 g, according to example 2) and mixed under reduced pressure (2000 rpm, 20 s, 200 mbar). The finished hardener component was transferred into a polypropylene cartridge and stored at 23° C.

Example 12

A Speed-mixer (DAC 600.1 VAC-P—Hauschild, 2000 rpm, 20 sec) was used to mix silicone oil having a viscosity of 20'000 cP (100 g) with a silica dispersion (33.3 g). Thereafter, TEOS (27.8 g, Dynasylan A, Evonik) and oligo-TEOS (66.7 g, Dynasylan 40, Evonik) were added and the mixture was mixed again (2000 rpm, 20 sec). Thereafter, carbon black (22.2 g, Monarch 460, Cabot) was roughly incorporated manually, followed by mixing again on the Speed-mixer (2000 rpm, 20 sec). Prior to the addition to the hardener component, the adhesion promoter was premixed at 60° C. for 30 min. Addition of the adhesion promoter (40.0 g, Geniosil GF 80:Geniosil GF 94 (2:1), Wacker) was followed by mixing (2000 rpm, 20 sec). Finally, the catalyst was added (12.8 g, according to example 1) and mixed under reduced pressure (2000 rpm, 20 s, 200 mbar). The finished hardener component was transferred into a polypropylene cartridge and stored at 23° C.

Examples 13 to 21 describe finished inventive and non-inventive two-component compositions comprising a polymer component A and a hardener component B.

Example 13 (Comparative Example)

Hardener component according to example 4 and polymer component according to example 3 were mixed in a volume ratio of 1:10 with a Speed-mixer (DAC 600.1 VAC-P, 1500 rpm, 60 sec). The mixture obtained served for production of test specimens for determination of hardness (to ISO 868), and of adhesion properties (to DIN 54457). Adhesion tests were conducted on float glass (Rocholl) and PVC (Rocholl). Glass specimens were merely cleaned (Sika Cleaner P, Sika); PVC was additionally activated (Sika Aktivator 205, Sika). Adhesion was determined after storage at 23° C./50% r.h. (relative air humidity) for 7 d and after storage in hot water (55° C.) for 21 d.

In addition, the curing rate (pot life) was determined in the same volume ratio. The polymer component and the hardener component were mixed in a Speed-mixer (DAC 400, Hauschild, 1800 rpm, 60 s). The characteristics of the mixture were assessed at regular intervals. If the mixture was no longer classifiable as a paste, the pot life was considered to have been attained.

Example 14 (Comparative Example)

The procedure was analogous to example 13 with the hardener component according to example 5 and polymer component according to example 3.

Example 15 (Comparative Example)

The procedure was analogous to example 13 with the hardener component according to example 6 and polymer component according to example 3.

Example 16

The procedure was analogous to example 13 with the hardener component according to example 7 and polymer component according to example 3.

Example 17

The procedure was analogous to example 13 with the hardener component according to example 8 and polymer component according to example 3.

Example 18

The procedure was analogous to example 13 with the hardener component according to example 9 and polymer component according to example 3.

Example 19

The procedure was analogous to example 13 with the hardener component according to example 10 and polymer component according to example 3.

Example 20

The procedure was analogous to example 13 with the hardener component according to example 11 and polymer component according to example 3.

The test results of examples 13 to 21 are shown in tables 4 and 5.

TABLE 4

Test results (pot life, Shore A hardness and adhesion) of examples 13-16.

| | Ex. 13 | Ex. 14 | Ex. 15 | Ex. 16 |
|---|---|---|---|---|
| Pot life [min] | 8.25 | 8 | 12 | 16 |
| Shore A hardness (7 d RT) | 35 | 34 | 38 | 34 |
| Glass adhesion (7 d RT) [% cohesive failure] | 100 | 100 | 100 | 100 |
| Glass adhesion (14 d 55° C. H$_2$O) [% cohesive failure] | 100 | 0 | 0 | 100 |

TABLE 5

Test results (pot life, Shore A hardness and adhesion) of examples 17-21.

| | Ex. 17 | Ex. 18 | Ex. 19 | Ex. 20 |
|---|---|---|---|---|
| Pot life [min] | 27 | 24 | 11 | 68 |
| Shore A hardness (7 d RT) | 31 | 33 | 31 | 33 |
| Glass adhesion (7 d RT) [% cohesive failure] | 100 | 100 | 100 | 100 |
| Glass adhesion (14 d 55° C. H$_2$O) [% cohesive failure] | 100 | 100 | 80 | 75 |

The invention claimed is:

1. A crosslinkable silicone composition comprising a. at least one condensation-crosslinkable polydiorganosiloxane P having silanol, alkoxysilyl, carboxysilyl, ketoximinosilyl, amidosilyl and/or aminosilyl end groups;

b. at least one silane or siloxane crosslinker V for the condensation-crosslinkable polydiorganosiloxane;

c. at least one crosslinking catalyst K1 of the general formula (I)

where $Z^1$ and $Z^2$ independently represent H or linear or branched oligodiorganylsiloxanes of the general formulae (II) and (III), and

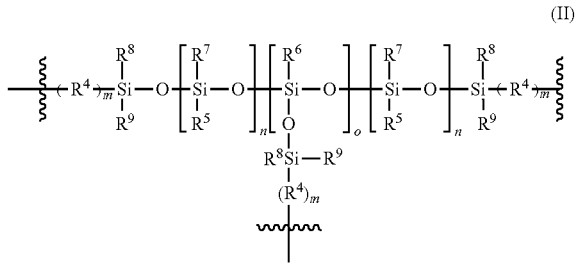

-continued

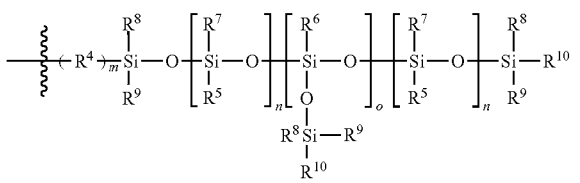

(III)

where index n represents an integer value from 1 to 400; index m represents an integer value of 1, 2 or 3; index o represents an integer value from 0 to 10; and the $R^5$ to $R^{10}$ radicals independently represent a monovalent aliphatic linear or branched C1 to C8 alkyl radical which optionally contains ring structures and/or heteroatoms selected from the group of halogens, N, O, P and S;

the $R^4$ radical independently represents a divalent aliphatic linear or branched C1 to C8 alkyl radical which optionally contains ring structures and/or heteroatoms selected from the group of halogens, N, O, P and S; and the $R^1$ to $R^3$ radicals independently represent a hydrogen atom or an aliphatic linear or branched C1 to C8 alkyl radical which optionally contains ring structures and/or heteroatoms selected from the group of halogens, N, O, P and S, where the $R^1$ to $R^3$ radicals may be joined to form one or two aliphatic or aromatic rings and the guanidine of the formula (I) may optionally be in protonated form;

wherein at least one $Z_1$ or $Z_2$ is a linear or branched oligodiorganylsiloxane of the formula (II) or formula (III);

d. a metal catalyst K2, the catalyst K2 comprising an element selected from groups 4, 8, 12, 13 and 15 of the Periodic Table of the Elements; and e. at least one adhesion promoter H of the general formula (IV)

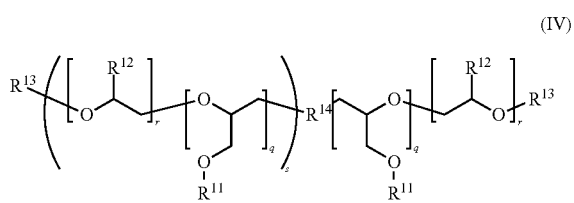

(IV)

where indices q, r and s independently represents an integer value from 0 to 10, wherein a sum total of q+r≥1;

the $R^{11}$ radicals are independently a monovalent linear or branched C1-C21 alkyl radical which may be substituted by one or more heteroatoms selected from the group of B, N, O, Si, S and P and/or may contain aliphatic or aromatic cycles and/or may contain double bonds;

the $R^{12}$ radicals are independently a monovalent linear or branched C3-C21 alkyl radical which may be substituted by one or more heteroatoms selected from the group of B, N, O, Si, S and P and/or may contain aliphatic or aromatic cycles and/or may contain double bonds;

the $R^{13}$ radicals are independently a hydrogen atom or an $R^{11}$ radical;

the $R^{14}$ radicals are independently a divalent linear or branched C1-C21 alkyl radical which may be substituted by one or more heteroatoms selected from the group of B, N, O, Si, S and P and/or may contain aliphatic or aromatic cycles and/or may contain double bonds;

wherein the adhesion promoter H has been prepared from at least one epoxide and at least one amine that have been used in a molar ratio of epoxy groups to amine groups of 1:1 to 2:1.

2. The silicone composition as claimed in claim 1, wherein the polydiorganosiloxane P has silanol, methoxysilane, ethoxysilane or acetoxysilane end groups.

3. The silicone composition as claimed in claim 1, wherein the composition is free of organotin compounds.

4. The silicone composition as claimed in claim 1, wherein the silane or siloxane crosslinker V for the condensation-crosslinkable polydimethylsiloxane comprises at least one tri- or tetrafunctional silane or hydrolyzates, partial hydrolyzates and/or condensates thereof.

5. The silicone composition as claimed claim 1, wherein the adhesion promoter H contains at least one alkoxysilane group.

6. The silicone composition as claimed in claim 1, wherein the adhesion promoter H has been prepared from at least one epoxysilane and at least one amine or at least one aminosilane and at least one epoxide.

7. The silicone composition as claimed in claim 1, wherein the adhesion promoter H has been prepared from at least one epoxysilane and at least one aminosilane.

8. The silicone composition as claimed in claim 1, wherein the adhesion promoter H is present in the composition in an amount of between 0.5% and 2.5% by weight, based on the overall composition.

9. The silicone composition as claimed in claim 1, wherein the composition is a two-component silicone composition consisting of a polymer component A comprising the at least one reactive polydiorganosiloxane polymer P, optionally a filler F, which may optionally be hydrophobized, and optionally at least one plasticizer;

and a hardener component B comprising the at least one crosslinker V for polydiorganosiloxanes, the catalyst K1, the metal catalyst K2, the adhesion promoter H, optionally a filler F, which may optionally be hydrophobized, and optionally at least one plasticizer.

10. The silicone composition as claimed in claim 9, wherein the weight ratio of component A to component B is ≥1:1.

11. A built construction or fabricated article that has been bonded, sealed, cast or coated with a silicone composition as claimed in claim 1.

12. A method for improving the adhesion of a two-component silicone composition, comprising adding to a two-component silicone composition:

a. at least one crosslinking catalyst K1 of the general formula (I)

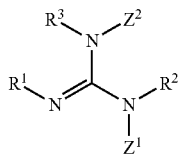
(I)

where $Z^1$ and $Z^2$ independently represent H or linear or branched oligodiorganylsiloxanes of the general formulae (II) and (III), and

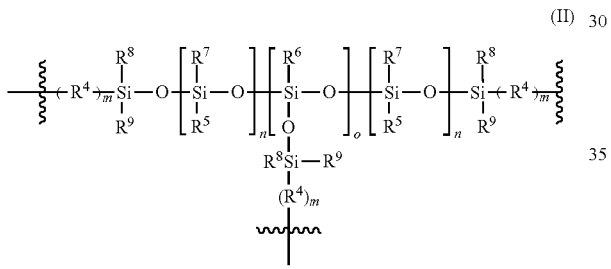
(II)

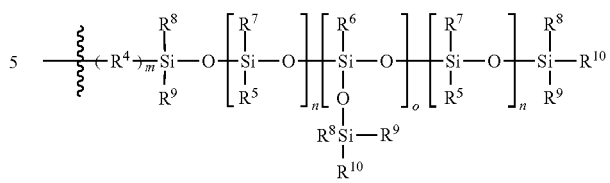
(III)

where index n represents an integer value from 1 to 400; index m represents an integer value of 1, 2 or 3; index o represents an integer value from 0 to 10; and the $R^5$ to $R^{10}$ radicals independently represent a monovalent aliphatic linear or branched C1 to C8 alkyl radical which optionally contains ring structures and/or heteroatoms selected from the group of halogens, N, O, P and S;

the $R^4$ radical independently represents a divalent aliphatic linear or branched C1 to C8 alkyl radical which optionally contains ring structures and/or heteroatoms selected from the group of halogens, N, O, P and S; and the $R^1$ to $R^3$ radicals independently represent a hydrogen atom or an aliphatic linear or branched C1 to C8 alkyl radical which optionally contains ring structures and/or heteroatoms selected from the group of halogens, N, O, P and S, where the $R^1$ to $R^3$ radicals may be joined to form one or two aliphatic or aromatic rings and the guanidine of the formula (I) may optionally be in protonated form;

wherein at least one $Z_1$ or $Z_2$ is a linear or branched oligodiorganylsiloxane of the formula (II) or formula (III); and b. a metal catalyst K2, the catalyst K2 comprising an element selected from groups 4, 8, 12, 13 and 15 of the Periodic Table of the Elements; and c. at least one adhesion promoter H of the general formula (IV)

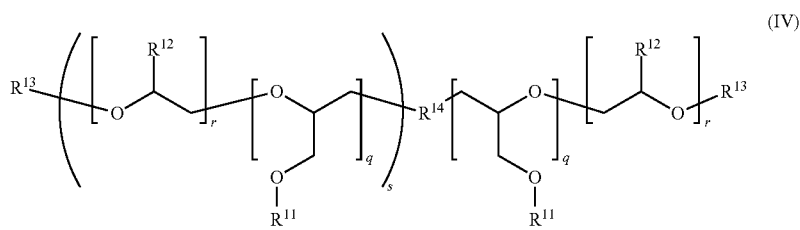
(IV)

where indices q, r and s independently represents an integer value from 0 to 10, wherein a sum total of q+r≥1;

the $R^{11}$ radicals are independently a monovalent linear or branched C1-C21 alkyl radical which may be substituted by one or more heteroatoms selected from the group of B, N, O, Si, S and P and/or may contain aliphatic or aromatic cycles and/or may contain double bonds;

the $R^{12}$ radicals are independently a monovalent linear or branched C3-C21 alkyl radical which may be substituted by one or more heteroatoms selected from the group of B, N, O, Si, S and P and/or may contain aliphatic or aromatic cycles and/or may contain double bonds;

the $R^{13}$ radicals are independently a hydrogen atom or an $R^{11}$ radical;

the $R^{14}$ radicals are independently a divalent linear or branched C1-C21 alkyl radical which may be substituted by one or more heteroatoms selected from the group of B, N, O, Si, S and P and/or may contain aliphatic or aromatic cycles and/or may contain double bonds;

wherein the adhesion promoter H has been prepared from at least one epoxide and at least one amine that have been used in a molar ratio of epoxy groups to amine groups of 1:1 to 2:1.

13. The method as claimed in claim 12, wherein the two-component composition is free of organotin compounds.

14. A method comprising applying to a substrate the silicone composition as claimed in claim 1 as an adhesive, a sealant, a coating or a casting compound.

* * * * *